(12) United States Patent
Anchondo

(10) Patent No.: US 8,474,195 B1
(45) Date of Patent: Jul. 2, 2013

(54) STORAGE RESERVOIR WALL SYSTEM

(76) Inventor: Todd Anchondo, Tuscon, AZ (US)

( * ) Notice: Subject to any disclaimer, the term of this patent is extended or adjusted under 35 U.S.C. 154(b) by 9 days.

(21) Appl. No.: 13/291,499

(22) Filed: Nov. 8, 2011

Related U.S. Application Data

(63) Continuation-in-part of application No. 12/729,699, filed on Mar. 23, 2010, now Pat. No. 8,074,405.

(60) Provisional application No. 61/210,894, filed on Mar. 24, 2009.

(51) Int. Cl.
*E04B 1/92* (2006.01)

(52) U.S. Cl.
USPC .............................. 52/168; 52/302.1; 405/284

(58) Field of Classification Search
USPC .............. 52/168, 302.1, 302.3, 302.4, 592.1, 52/578, 582.1; 256/24; 405/110, 111; 137/357
See application file for complete search history.

(56) References Cited

U.S. PATENT DOCUMENTS

| | | | |
|---|---|---|---|
| 4,773,629 A | 9/1988 | Yodock | |
| 4,910,931 A * | 3/1990 | Pardue, Jr. | 52/169.5 |
| 5,551,578 A | 9/1996 | McCue et al. | |
| 5,730,179 A | 3/1998 | Taylor | |
| 5,833,332 A | 11/1998 | Marshall et al. | |
| 5,852,906 A * | 12/1998 | Kuban | 52/302.1 |
| 5,873,383 A * | 2/1999 | Takai et al. | 137/357 |
| 6,059,491 A * | 5/2000 | Striefel et al. | 405/111 |
| 6,324,782 B1 | 12/2001 | Gaston | |
| 6,526,699 B1 * | 3/2003 | Foglio, Sr. | 52/15 |
| 6,966,333 B1 * | 11/2005 | Kuehneman | 137/357 |
| 7,603,823 B2 | 10/2009 | Cann | |
| 2003/0046888 A1 * | 3/2003 | Ryan | 52/302.1 |
| 2006/0150531 A1 | 7/2006 | Cann | |

FOREIGN PATENT DOCUMENTS

WO 9311310 A1 6/1993

OTHER PUBLICATIONS www.rainwaterhog.com, modular water storage, Jul. 19, 2011.*

* cited by examiner

*Primary Examiner* — William Gilbert
*Assistant Examiner* — Gisele Ford

(57) ABSTRACT

A storage reservoir wall system having one or more wall units, a wall unit having a wall first side, a wall second side, a wall first end having a first end mounting attachment, a wall second end having a second end mounting attachment, a wall top, a wall bottom, one or more hollow reservoir chambers constructed from a material that is non-permeable, and one or more liquid access apertures in one or more of the wall first side, wall second side, wall first end, wall second end, wall top, or wall bottom, said liquid access aperture fluidly connecting to the hollow reservoir chamber.

2 Claims, 8 Drawing Sheets

STORAGE RESERVOIR WALL SYSTEM

CROSS REFERENCE

This application claims priority to U.S. non-provisional application Ser. No. 12/729,699 filed Mar. 23, 2010 as a continuation-in-part, the specification of which is incorporated herein by reference in its entirety.

BACKGROUND OF THE INVENTION

Collecting water and saving it for a time of need can help save an individual money as well as help conserve valuable water resources. Some individuals place large bins throughout their yards for collecting rainwater. However, these bins can be cumbersome and unsightly. Some rainwater collecting devices are not freestanding and require that they be mounted to walls of houses or already existing garages and sheds. The present invention features a freestanding wall reservoir system for storing water to be saved for later use. The system of the present invention can be used for creating an aesthetically appealing structure, for example a yard enclosure, a garage, a shed, and/or the like.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
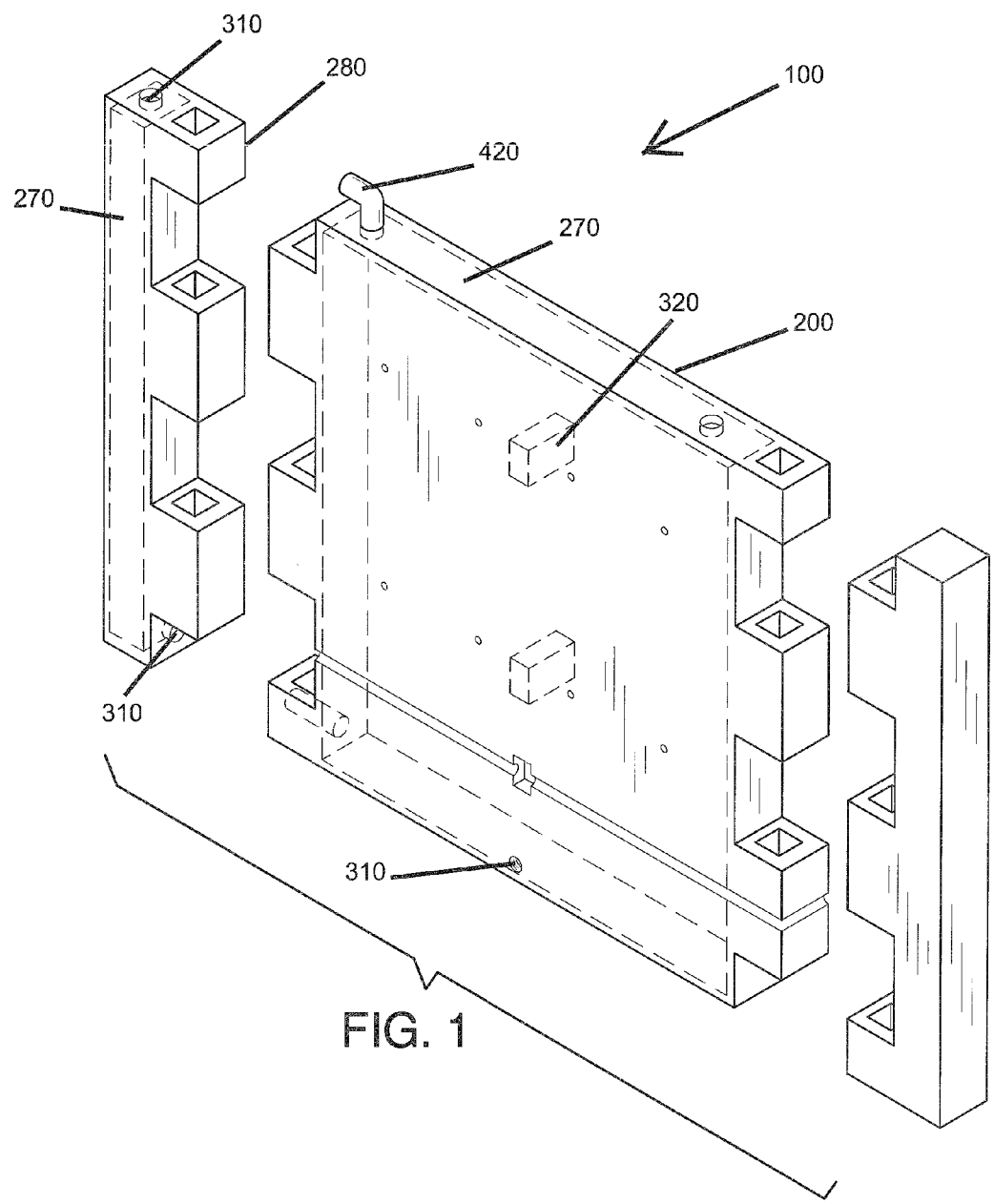
FIG. 1 shows an isometric view of a storage reservoir wall system.
Figure 2:
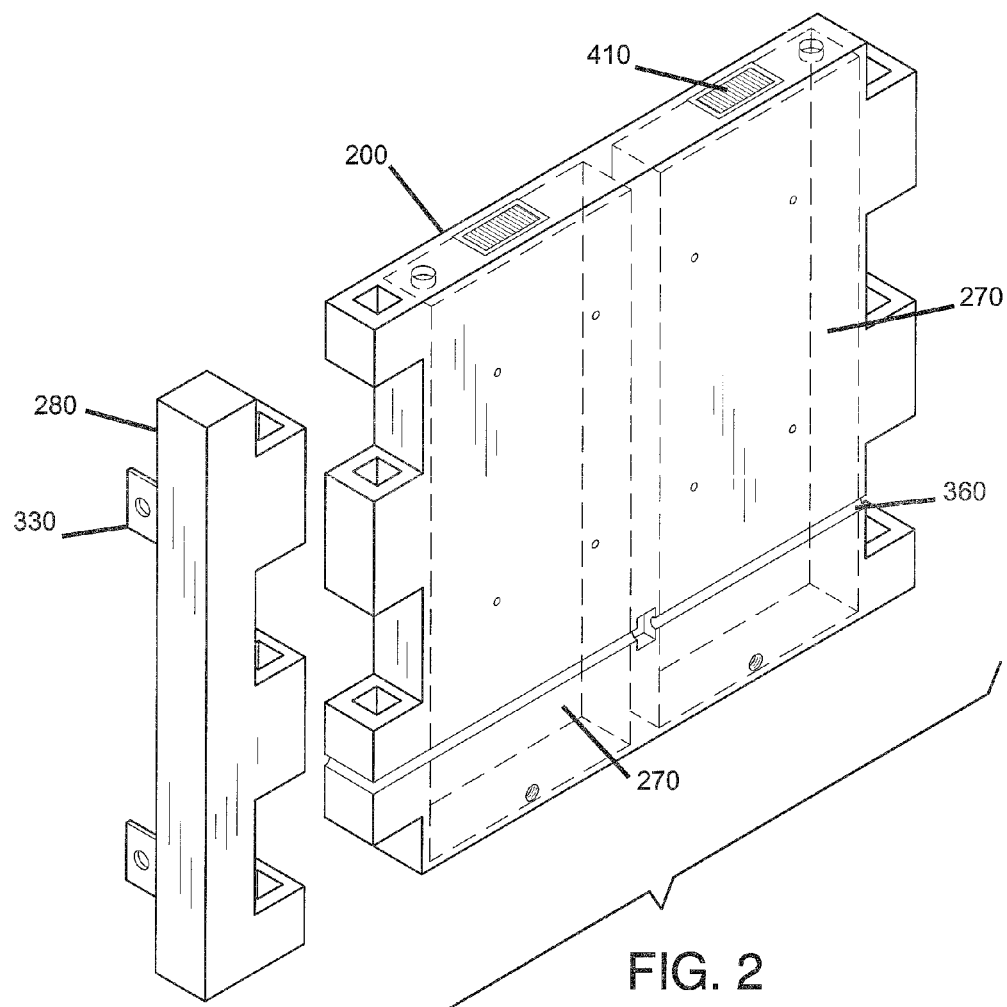
FIG. 2 shows a detailed isometric view of a wall unit and a wall end unit, featuring two hollow reservoir chambers and a utility mounting system.
Figure 3:
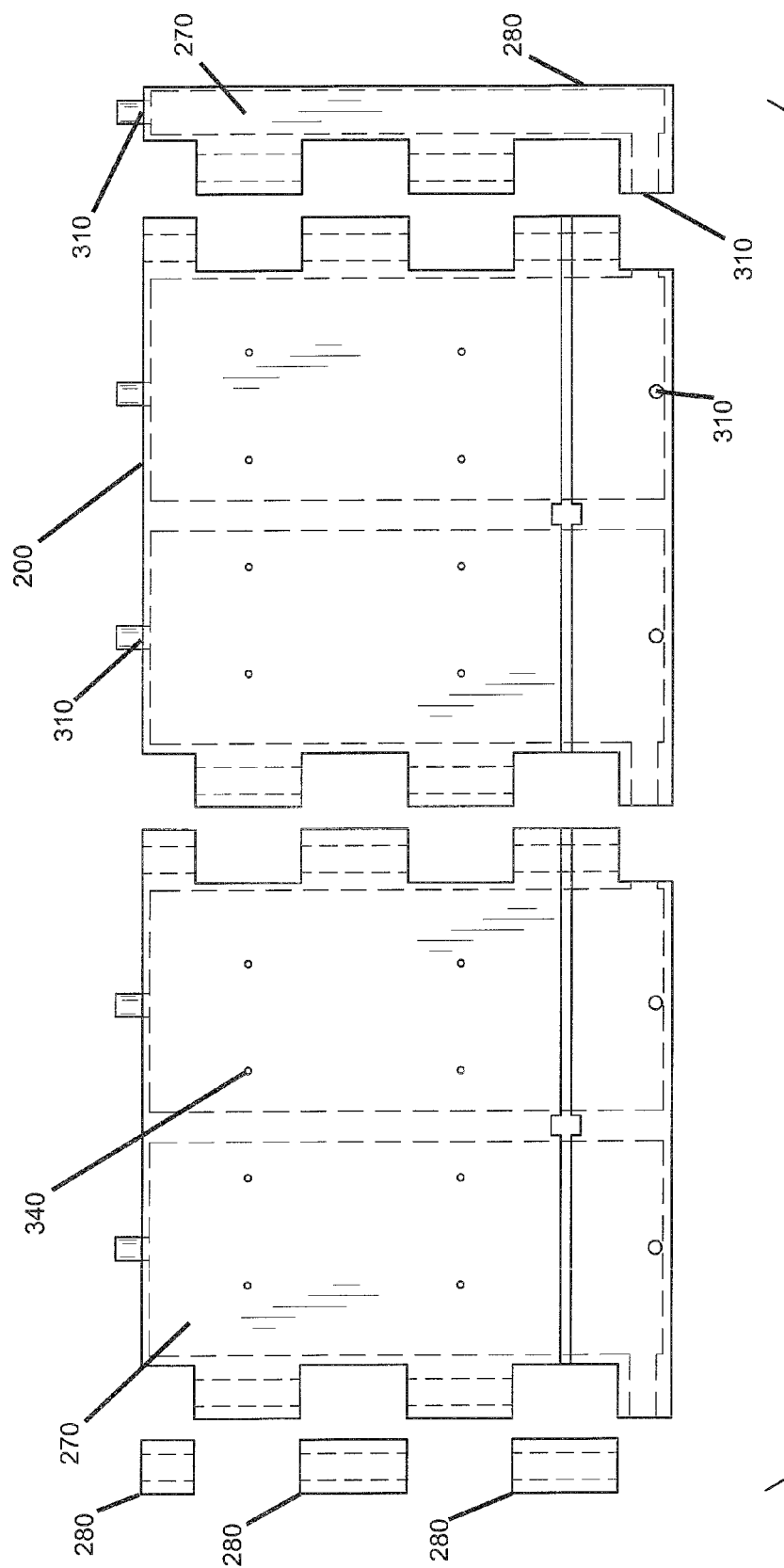
FIG. 3 shows a frontal view of a storage reservoir wall system including two wall units and two differing styles of wall end units, featuring multiple hollow reservoir chambers and a surface mounting system.
Figure 4:
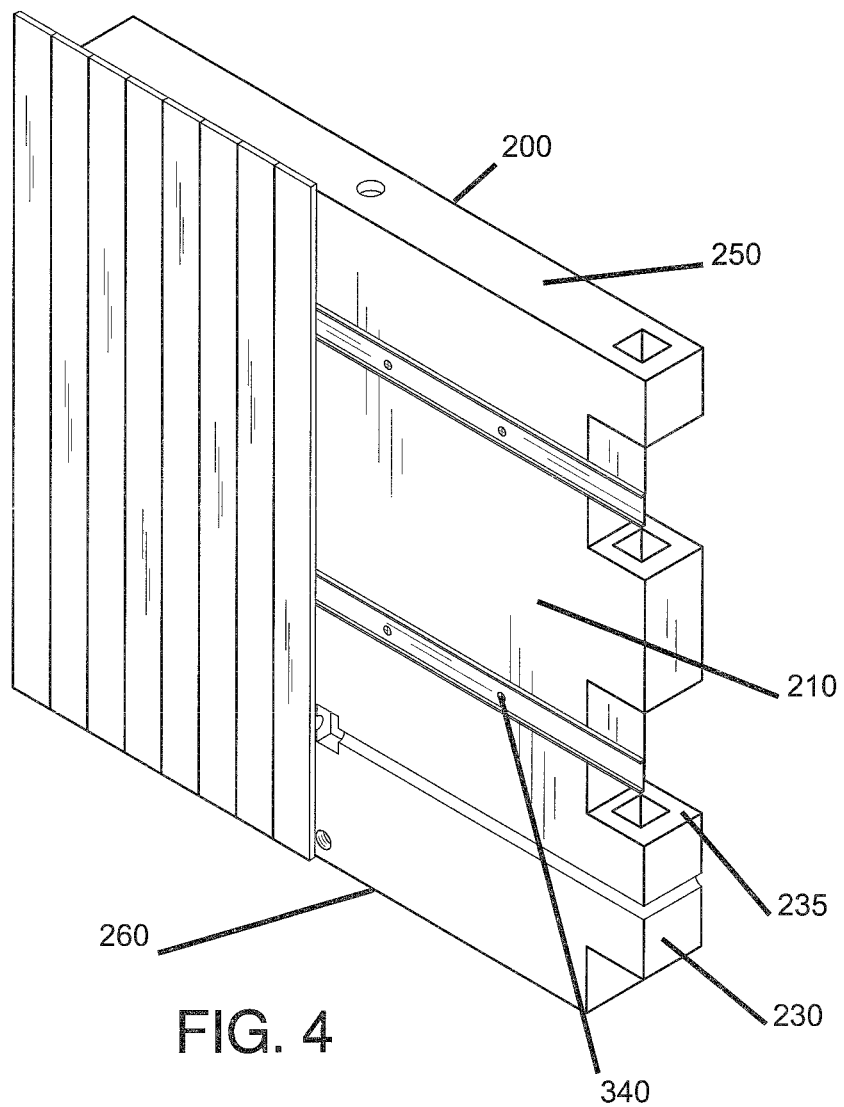
FIG. 4 shows an isometric view of a first side and a first end of the wall unit.
Figure 5:
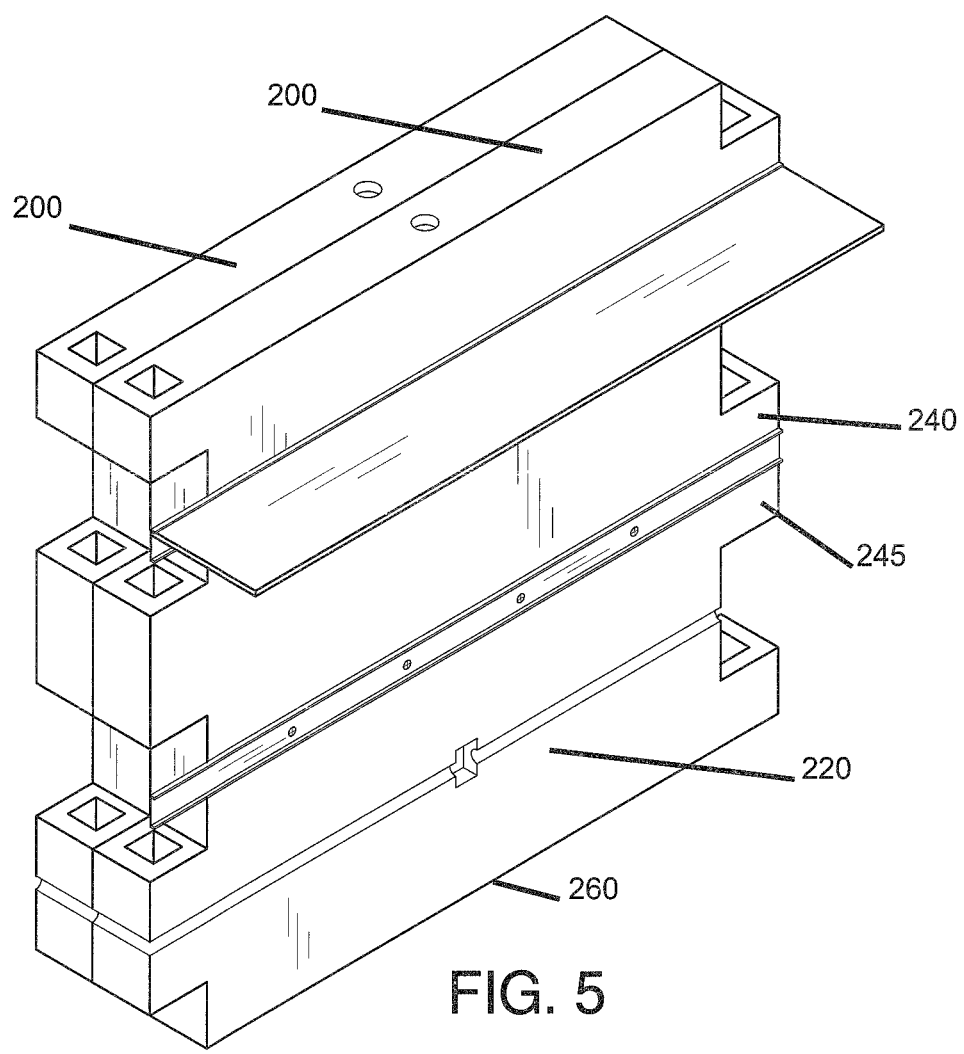
FIG. 5 shows an isometric view of a second side and a second end of a wall unit with a second wall unit shown in a horizontally parallel, "sandwiched" position.
Figure 6:
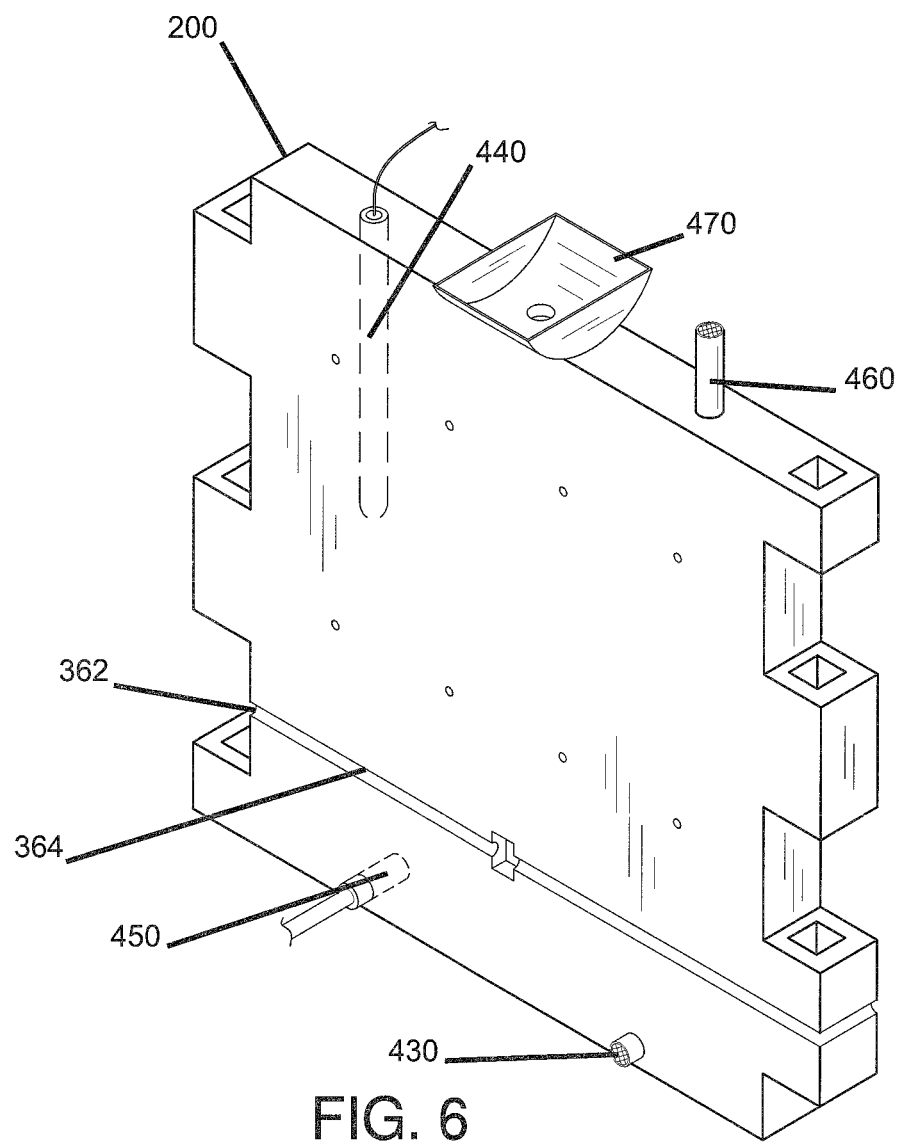
FIG. 6 shows a detailed isometric view of a first side of a wall unit.
Figure 7:
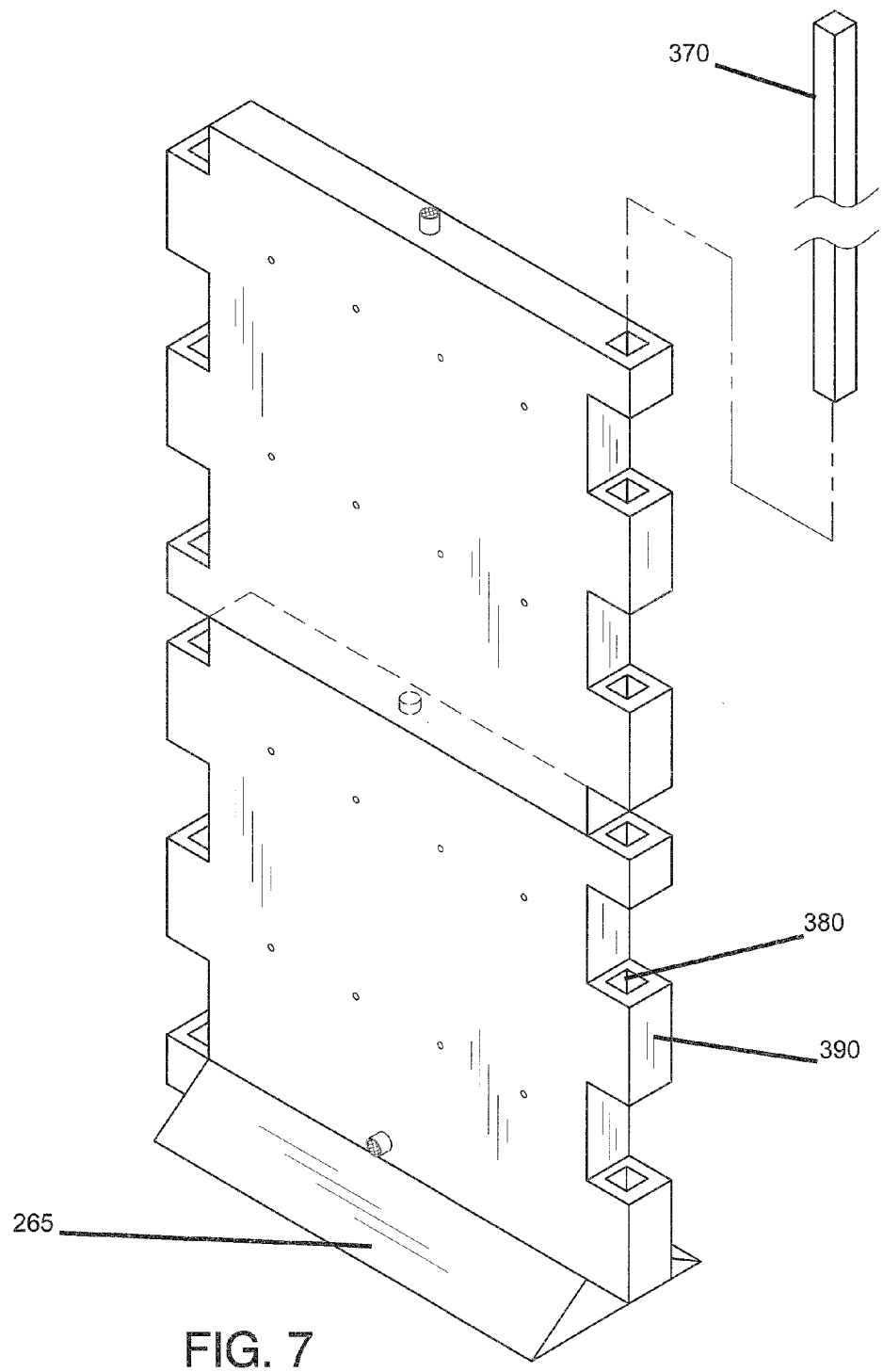
FIG. 7 shows an isometric view of two wall units stacked upon one another with an anchor post.
Figure 8:
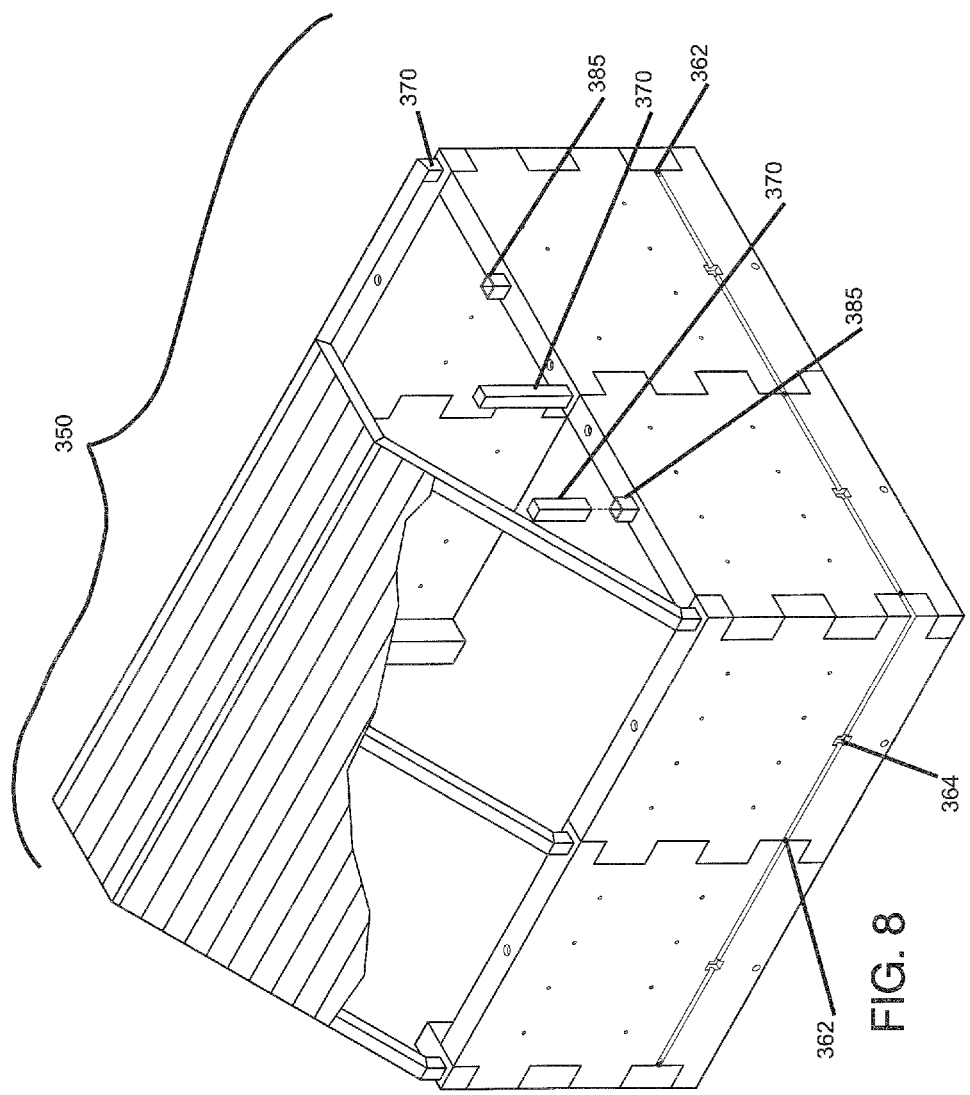
FIG. 8 shows an isometric view of a storage reservoir wall system featuring a structural mounting system.

100 Storage reservoir wall system
200 Wall unit
210 Wall first side
220 Wall second side
230 Wall first end
235 First end mounting attachment
240 Wall second end
245 Second end mounting attachment
250 Wall top
260 Wall bottom
265 Mounting base
270 Hollow reservoir chamber
280 Wall end unit
310 Liquid access aperture
320 Support component
330 Anchoring mount
340 Surface mounting system
350 Structural mounting system
360 Utility mounting system
362 Utility aperture
364 Utility relief
370 Anchor post
380 Mounting aperture
385 Mounting flange
390 Mounting extension
410 Vapor venting system
420 Liquid overflow system
430 Particulate filtration device
440 Organic matter treatment device
450 Pump
460 Inlet pipe
470 Rain collection trough Referring now to FIGS. 1-8, the present invention features a storage reservoir wall system (100) for storage of an internal contents. In some embodiments, the wall system (100) can be used to store rainwater for future use while in some embodiments, the wall system (100) can be used to store water obtained from an alternate source. Stored water can be used for drinking water for humans, livestock, or pets or for non-potable applications, for example, irrigation, washing, misting, portable toilets, or many other uses. In some embodiments, the wall system (100) can be used to store a liquid chemical, for example, fertilizer, herbicide or fuel. In some embodiments, the wall system can be used to store a granular media, for example, sand, gravel, fertilizer, salt, grain or pet food.

In some embodiments, the wall system (100) comprises one or more wall units (200). The system (100) may consist of a single wall unit (200), or multiple wall units (200) connected together.

In some embodiments, the wall unit (200) comprises a wall first side (210) and a wall second side (220). The wall first side (210) and the wall second side (220) may be constructed in a similar manner or there may be differences. In some embodiments, the wall first side (210) may have a decorative visual treatment. In some embodiments, the wall second side (220) may have a decorative visual treatment.

In some embodiments, the wall unit (200) may comprise a specific color. In some embodiments, the first wall unit (200) may comprise a surface coating. In some embodiments, the wall unit (200) may comprise an embossed surface.

In some embodiments, the wall unit (200) further comprises a wall first end (230) that comprises a first end mounting attachment (235) disposed thereon, and a wall second end (240) that comprising a second end mounting attachment (245) disposed thereon. The first end mounting attachment (235) of one wall unit (200) is designed to mechanically and fluidly attach and integrate with the second end mounting attachment (245) of another wall unit (200) to fully connect two or more wall units (200). In some embodiments the first end mounting attachment (235) and the second end mounting attachment (245) comprise a set of rings that a pole slidably engages. In some embodiments the first end mounting attachment (235) and the second end mounting attachment (245) comprise a set of attaching brackets. In some embodiments the first end mounting attachment (235) and the second end mounting attachment (245) comprise a plurality of bolts, nuts and washers. In some embodiments the first end mounting attachment (235) and the second end mounting attachment (245) comprise one or more attaching methods commonly used in construction of buildings and fences.

In some embodiments, the first end mounting attachment (235) comprises a set of teeth disposed thereon. In some embodiments, the second end mounting attachment (245) comprises a set of teeth disposed thereon that is positioned in an offsetting manner with regards to the teeth disposed on the first end mounting attachment (235). In some embodiments, the set of teeth on the first end mounting attachment (235) of a first wall unit (200) engages the set of teeth on the second end mounting attachment (245) of a second wall unit (200). In some embodiments, a mounting aperture (380) is disposed on the top surface of each member of the set of teeth and extends throughout the middle cross section of each member of the set of teeth on the first end mounting attachment (235). In some embodiments, a mounting aperture (380) is disposed on the top surface of each member of the set of teeth and extends throughout the middle cross section of each member of the set of teeth on the second end mounting attachment (245) where, when the teeth of the first end mounting attachment (235) are engaged with the teeth of the second end mounting attachment (245), a channel is formed, vertically through the middle cross section of the engaged teeth.

In some embodiments, an anchor post (370) is slidably disposed through the channel formed by the engaged teeth from the first end mounting attachment (235) and the second end mounting attachment (245).

In some embodiments, the wall unit (200) comprises a wall top (250) and a wall bottom (260). In some embodiments, the wall bottom (260) comprises a mounting base (265) disposed thereon. The wall top (250) and the wall bottom (260) may be constructed in a similar manner or there may be differences. In some embodiments, the mounting base (265) is integrated with the wall bottom (260), while in some embodiments the mounting base (265) is a separate unit that is attachable to the wall bottom (260). The mounting base (265) may include apertures, reliefs or attaching points to facilitate various methods that can be used to secure the wall system (100) to a solid base or to the ground. In some embodiments, the wall bottom (260) may include apertures, reliefs or attaching points to facilitate various methods that can be used to secure the wall system (100) to a solid base or to the ground.

In some embodiments, the wall unit (200) measures between 1" and 24" from the wall bottom (260) to the wall top (250). In some embodiments, the wall unit (200) measures between 24" and 48" from the wall bottom (260) to the wall top (250). In some embodiments, the wall unit (200) measures between 48" and 72" from the wall bottom (260) to the wall top (250). In some embodiments, the wall unit (200) measures between 72" and 96" from the wall bottom (260) to the wall top (250). In some embodiments, the wall unit (200) measures between 96" and 120" from the wall bottom (260) to the wall top (250).

In some embodiments, the wall unit (200) measures between 1" and 24" from the wall first end (230) to the wall second end (240). In some embodiments, the wall unit (200) measures between 24" and 48" from the wall first end (230) to the wall second end (240). In some embodiments, the wall unit (200) measures between 48" and 72" from the wall first end (230) to the wall second end (240). In some embodiments, the wall unit (200) measures between 72" and 96" from the wall first end (230) to the wall second end (240). In some embodiments, the wall unit (200) measures between 96" and 120" from the wall first end (230) to the wall second end (240). In some embodiments, the wall unit (200) measures between 120" and 144" from the wall first end (230) to the wall second end (240).

In some embodiments, the wall unit (200) measures between 1" and 6" from the wall first side (210) to the wall second side (220). In some embodiments, the wall unit (200) measures between 6" and 12" from the wall first side (210) to the wall second side (220). In some embodiments, the wall unit (200) measures between 12" and 24" from the wall first side (210) to the wall second side (220). In some embodiments, the wall unit (200) measures greater than 24" from the wall first side (210) to the wall second side (220).

In some embodiments, one or more hollow reservoir chambers (270) are disposed in the wall unit (200). In some embodiments, the hollow chamber (270) may be formed by a manufacturing process during fabrication of the wall unit (200), for example, blow molding, rotational molding or another manufacturing process. In some embodiments, the hollow reservoir chamber (270) may be constructed as a separate unit and placed inside the wall unit (200). In some embodiments, the hollow reservoir chamber (270) is constructed from a material that is non-permeable, for example, metal, wood, fibreglass, carbon fibre, or plastic. In some embodiments, the hollow reservoir chamber (270) is constructed from a rigid material, for example, metal, wood, fibreglass, carbon fibre, or plastic. In some embodiments, the hollow reservoir chamber (270) is constructed from a pliable material, for example, plastic.

In some embodiments, there are one or more liquid access apertures (310), disposed in one or more of the following locations: wall first side (210), wall second side (220), wall first end (230), wall second end (240), wall top (250), or wall bottom (260). The liquid access aperture (310) fluidly connects to the hollow reservoir chamber (270). In some embodiments, there is a minimum of one liquid access aperture (310) and no maximum number of liquid access apertures (310) that may be disposed on the wall unit (200). In some embodiments, a spigot is fluidly connected to one or more liquid access apertures (310). In some embodiments, a threaded plug is installed in one or more liquid access apertures (310).

In some embodiments, the liquid access aperture (310) may be shaped like a polygon. In some embodiments, the liquid access aperture (310) may be circular. In some embodiments, the diameter of the liquid access aperture (310) measures from 0" to 1". In some embodiments, the diameter of the liquid access aperture (310) measures from 1" to 2". In some embodiments, the diameter of the liquid access aperture (310) measures from 2" to 3". In some embodiments, the diameter of the liquid access aperture (310) measures from 3" to 4". In some embodiments, the diameter of the liquid access aperture (310) measures from 4" to 12". In some embodiments, the diameter of the liquid access aperture (310) measures greater than 12".

In some embodiments, the wall unit (200) comprises a plurality of hollow reservoir chambers (270) fluidly isolated from each other. This feature allows for storage of different materials in the same wall unit (200). In some embodiments, one or more of the hollow reservoir chambers (270) are filled with a liquid, while in some embodiments, one or more of the hollow reservoir chambers (270) are filled with a granular media, for example salt, sand or gravel.

In some embodiments, one or more of the hollow reservoir chambers (270) are filled with a solidified material, for example, concrete. This allows the material in the hollow reservoir chamber (270) to be used as a means for stabilization of the wall system (100) by increasing the mass and density in given area of the wall system (100).

In some embodiments, a first hollow reservoir chamber (270) is able to be fluidly connected to a second hollow reservoir chamber (270) contained within the wall unit (200). In some embodiments, a hollow reservoir chamber (270) is able to be fluidly isolated from a second hollow reservoir chamber (270) contained within the wall unit (200).

In some embodiments, the first end mounting attachment (235) of a first wall first end (230) fluidly attaches to the second end mounting attachment (245) of a second wall second end (240) thereby fluidly joining a first wall unit (200) to a second wall unit (200). There is no limit to the number of wall units (200) that can be mechanically and fluidly joined in combination. By fluidly joining the wall units (200) in combination, the storage capacity of the wall system (100) is increased based on the sum of the additional capacity of the hollow reservoir chambers (270) contained in each additional wall unit (200).

In some embodiments, the wall system (100) further comprises one or more wall end units (280). The wall end unit (280) physically and fluidly connects to either the wall first end mounting attachment (235) or the wall second end mounting attachment (245). The wall end unit (280) provides a finished end cap for the wall system (100). For example, a finished end cap could comprise a flat end surface with no visible attaching means on the flat end and either a first end mounting attachment (235) or a second end mounting attachment (245) on the other end of the wall system (100). In some embodiments, a wall end unit (280) could comprise a set of blocks to fill in any unfilled voids on the end of a wall unit (200).

In some embodiments, the wall end unit (280) is a corner, joining two wall units. For example, a corner would consist of two flat end surfaces, positioned ninety degrees from one another, facing outward. In addition, one of the two remaining sides would comprise a wall first end mounting attachment (235) and the second of the two remaining sides would comprise a second end mounting attachment (245). In some embodiments, the wall end unit (280) can be used to join two, three, four or more wall units (200) approaching from multiple directions into a common intersection.

In some embodiments, the wall unit (200) is constructed from a material that is resistant to deflection, for example, metal, wood, fibreglass, carbon fibre, or plastic. In some embodiments, the wall unit (200) is constructed from a material that is non-permeable, for example, metal, wood, fibreglass, carbon fibre, or plastic.

In some embodiments, the wall unit (200) is either partially or entirely below grade. By locating the wall system (100) partially or entirely below grade, the wall system (100) utilizes compacted earth for mounting stability. In some embodiments, the wall unit utilizes the temperature of the earth as a mechanism of heat transfer for the contents of the hollow reservoir chambers (270).

In some embodiments, the wall unit (200) comprises one or more support components (320) disposed therein to minimize deflection, for example, gussets, ribs, beams, webbing, fibrous mesh, or bracing across a span. In some embodiments, the support components (320) may be integrated into the construction of the wall unit (200) or the hollow reservoir chamber (270). In some embodiments, the support component is a separate component. In some embodiments, the support component is formed during the manufacturing process of the wall unit (200). In some embodiments, the support component (320) can be integrated into the surface mounting system where a hole is drilled through the support component (320).

In some embodiments, the wall unit (200) comprises one or more anchoring mounts (330). The anchoring mount (330) comprises a way for attaching the wall system (100) to another separate entity. The anchoring mount (330) provides a method of attaching to a building wall, a fence, a pole or any separate structure.

In some embodiments, the wall bottom (260) of a first wall unit (200) is vertically stackable upon the wall top (250) of a second wall unit (200). The wall bottom (260) of the first wall unit (200) is mechanically and fluidly connectable with the wall top (250) of the second wall unit (200). Stackable wall units (200) provide a method of expansion for storage capacity in the included hollow reservoir chambers (270). This feature also provides capacity for further isolation of stored materials in addition to structural versatility in the configuration of the wall units (200).

In some embodiments, the wall unit (200) may have an alternate shape, for example, a sloping wall top (250), or a window aperture disposed in the wall unit (200).

In some embodiments, the wall first side (210) of a first wall unit (200) is horizontally connectable to the wall second side (220) of a second wall unit (200). Further, the first wall unit (200) is mechanically and fluidly connectable with said second wall unit (200). This feature allows the sandwiching of wall units (200), thereby adding storage capacity with the included hollow reservoir chambers (270) disposed therein. In addition, this feature provides for further isolation of stored materials, and versatility in the configuration of the wall units (200).

In some embodiments, the system (100) comprises a vapor venting system (410) which provides for equalization of pressure between the hollow reservoir chamber (270) and atmospheric pressure. The pressure inside the hollow reservoir chamber (270) will vary based on the temperature with regards to the contents stored therein. Further, when adding or removing material from the hollow reservoir chamber (270), the pressure inside will vary, thus affecting the flow into or out of the hollow reservoir chamber (270). The vapor venting system (410) provides a means to equalize the pressure with atmospheric pressure, thus minimizing any the strain on the wall unit (200) and ensuring a smooth flow into and out of the hollow reservoir chamber (270).

In some embodiments, the system (100) comprises a liquid overflow system (420). The liquid overflow system (420) provides for a means for overfill relief for the hollow reservoir chamber (270) when being filled. This feature further minimizes strain on the wall unit (200).

In some embodiments, the system (100) comprises one or more particulate filtration devices (430). The particulate filtration device (430) may be disposed on a liquid access aperture (310) fluidly connected to the hollow reservoir chamber (270).

In some embodiments, the system (100) comprises one or more organic matter treatment (440) devices. The organic matter treatment device (440) may be an ultraviolet light, a chemical injection device, or another method for treatment of unwanted organisms, for example, algae or bacteria that could be found in the hollow reservoir chamber (270).

In some embodiments, the system (100) is interconnectable with structures comprised of concrete block construction, when the concrete blocks are of standardized sizing, for example 8"×8"×16", and the structures are constructed using standardized building techniques of one skilled in the art.

In some embodiments, the system (100) comprises a utility mounting system (360) that comprises a series of utility apertures (362) and utility reliefs (364) disposed on the surface of the wall unit (200). The utility apertures (362) and utility reliefs (364) are sized to facilitate attachment and placement of electrical conduit, electrical boxes, electrical switches, and other utility components of standardized design. In some embodiments the utility apertures (362) are located at the interface of the edges of adjoining wall units (200).

In some embodiments, the system (100) comprises an inlet pipe (460) disposed on the wall unit (200). The inlet pipe (460) is mechanically and fluidly connected to the liquid access aperture (310) disposed on the wall unit (200). The inlet pipe can be connected to a liquid supply channel, for example, rain guttering, or a water spigot, to fill the hollow reservoir chamber (270).

In some embodiments, the system (100) comprises one or more rain collection troughs (470). The shape and configuration of the rain collection trough (470) can vary widely. The rain collection trough (470) is mechanically and fluidly connected to the liquid access aperture (310) disposed on the wall unit (200).

In some embodiments, the wall unit (200) comprises a mounting base (265) dimensionally wider when measured from the wall first side (210) to the wall second side (220), than the wall top (250) when measured from the wall first side (210) to the wall second side (220). A mounting base (265) that is wider than the wall top (250) provides a greater measure of stability. This feature may be of added importance in free standing wall systems (100) with long, straight runs.

In some embodiments, the system (100) comprises one or more pumps (450) for the transfer of liquid. The pump (450) may be submersible or another style. Further the pump (450) may be mounted separate from the wall system (100), yet fluidly connected.

In some embodiments, the wall first side (210) comprises a surface mounting system (340) that may be used to attach a facade or a structure, for example, shelving, brick, wood, siding, rock, concrete, or stucco. The wall second side (220) also comprises a surface mounting system (340) that may be used to attach a facade or a structure, for example, shelving, brick, wood, siding, rock, concrete, or stucco. The surface mounting system (340) disposed on the wall first side (210) may be the same or different from the surface mounting system (340) disposed on the wall second side (220).

In some embodiments, the wall system (100) comprises a structural mounting system (350). In some embodiments, the structural mounting system (350) comprises an anchor post (370) that can be attached to a first end mounting attachment (235) or to a second end mounting attachment (245). In some embodiments, the anchor post (370) can be located on a wall first end (230). In some embodiments, the anchor post (370) can be located on a wall second end (240). In some embodiments one or more anchor posts (370) can be located in a middle part of the wall unit.

In some embodiments, the anchor post (370) extends vertically downward, towards the center of the earth, through a central cross section of the wall unit (200) into the ground beneath the wall system (100).

In some embodiments, the anchor post (370) extends vertically upward, away from the center of the earth, through a central cross section of the wall unit (200) and continues its projection vertically upward from and away from the wall top (250).

In some embodiments, the anchor post (370) is attached to the wall top (250) and extends vertically upward, away from the center of the earth, from and away from the wall top (250).

In some embodiments, the structural mounting system (350) may comprise one or more apertures disposed on the wall top (250). In some embodiments the apertures may be in the shape of a polygon. In some embodiments, the apertures may be in the shape of a circle. In some embodiments, the anchor post (370) may be inserted into the aperture to provide a base of mounting. In some embodiments, the structural mounting system (350) may comprise one or more cavities disposed in the wall unit (200) fluidly connected to an aperture on the wall top (250). In some embodiments the cavity may be in the shape of a rectangular solid. In some embodiments, the cavity may be in the shape of a cylinder. In some embodiments, the cavity may extend downward, toward the center of the earth, vertically throughout the middle cross-section of the wall unit (200). In some embodiments, the anchor post (370) may be inserted into the cavity to provide a solid mounting base. In some embodiments, the cavity is sized to receive the anchor post (370).

In some embodiments, the anchor post (370) may be a square post, cut to a specific length, for example, a 4"×4" post 8' long. In some embodiments, the anchor post (370) may be a round post cut to a specific length, for example, a 2" diameter, schedule 40 galvanized pipe, 8' long. In some embodiments, the anchor post (370) may be constructed from a rigid material, for example, wood, plastic, or metal.

In some embodiments, the structural mounting system (350) comprises a mounting flange (385) disposed on the wall top (250) that attaches to the anchor post (370). In some embodiments, the mounting flange is moulded into the wall top (250), while in some embodiments; the mounting flange is a separate unit attached to the wall top (250).

In some embodiments, the structural mounting system (350) may further comprise one or more of the following: connecting points, anchor points, beams, trusses, studs, covering sections, and roofing sections. The structural mounting system (350) may be used in the construction of structures, for example, walls, fences, buildings, awnings, and shelters.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A storage reservoir wall system (100), said wall system (100) comprising:
 (a) one or more wall units (200), said wall unit (200) comprising:
  (i) a wall first side (210);
  (ii) a wall second side (220);
  (iii) a wall first end (230), said wall first end (230) comprising a first end mounting attachment (235) disposed thereon;
  (iv) a wall second end (240), said wall second end (240) comprising a second end mounting attachment (245) disposed thereon;
  (v) a wall top (250);
  (vi) a wall bottom (260);

(vii) one or more hollow reservoir chambers (270) disposed therein, said hollow reservoir chamber (270) constructed from a material that is non-permeable;

(viii) one or more liquid access apertures (310), said liquid access aperture (310) disposed in one or more of the following: wall first side (210), wall second side (220), wall first end (230), wall second end (240), wall top (250), or wall bottom (260), said liquid access aperture (310) fluidly connects to the hollow reservoir chamber (270); and (ix) a structural mounting system (350) disposed therein, said structural mounting system (350) comprises one or more anchor posts (370), said anchor post (370) extends upwardly from the wall top (250) and away from the wall top (250), said anchor post (370) is attached to the wall unit (200).

2. The system (100) of claim 1, wherein a first anchor post (370) is attached to the first end mounting attachment (235), wherein the first anchor post (370) is attached to the second end mounting attachment (245).

\* \* \* \* \*